(12) United States Patent
Cain

(10) Patent No.: US 11,233,838 B2
(45) Date of Patent: Jan. 25, 2022

(54) SYSTEM AND METHOD OF WEB STREAMING MEDIA CONTENT

(71) Applicant: GRASS VALLEY LIMITED, Newbury (GB)

(72) Inventor: James Westland Cain, Newbury (GB)

(73) Assignee: GRASS VALLEY LIMITED, Newbury (GB)

( * ) Notice: Subject to any disclaimer, the term of this patent is extended or adjusted under 35 U.S.C. 154(b) by 0 days.

(21) Appl. No.: 16/903,960

(22) Filed: Jun. 17, 2020

(65) Prior Publication Data
US 2020/0404036 A1    Dec. 24, 2020

Related U.S. Application Data

(60) Provisional application No. 62/864,990, filed on Jun. 21, 2019.

(51) Int. Cl.
*H04L 29/06* (2006.01)
*H04L 29/08* (2006.01)
*H04N 21/845* (2011.01)

(52) U.S. Cl.
CPC ........ *H04L 65/4084* (2013.01); *H04L 65/602* (2013.01); *H04L 67/02* (2013.01); *H04N 21/8456* (2013.01)

(58) Field of Classification Search
CPC ... H04L 65/4084; H04L 65/602; H04L 67/02; H04N 21/8456
See application file for complete search history.

(56) References Cited

U.S. PATENT DOCUMENTS

| | | | |
|---|---|---|---|
| 2007/0162568 A1* | 7/2007 | Gupta | H04N 21/23412 709/219 |
| 2009/0217352 A1* | 8/2009 | Shen | G06F 21/6218 726/3 |
| 2010/0262618 A1* | 10/2010 | Hedinsson | G06F 16/70 707/770 |

FOREIGN PATENT DOCUMENTS

WO    2018125590 A1    7/2018

OTHER PUBLICATIONS

International Search Report and Written Opinion for PCT/GB2020/051489, dated Aug. 28, 2020, 14 pages.

* cited by examiner

*Primary Examiner* — Kim T Nguyen
(74) *Attorney, Agent, or Firm* — Arent Fox LLP

(57) ABSTRACT

A system and method are provided for dynamic web streaming of media content without restore and batch processing. The system and method provides for a partial restore of media content, where a small sub-section of the archived media is requested by a user, for inclusion in an edit. The exemplary system and method provides a web server that offers grains for any part of an archived monolithic file to be made available just-in-time, instead of the batch processing. Because grains are available over HTTP, any part of the customer's archive is available to them instantly and dynamically with no restore process being required at all.

24 Claims, 3 Drawing Sheets

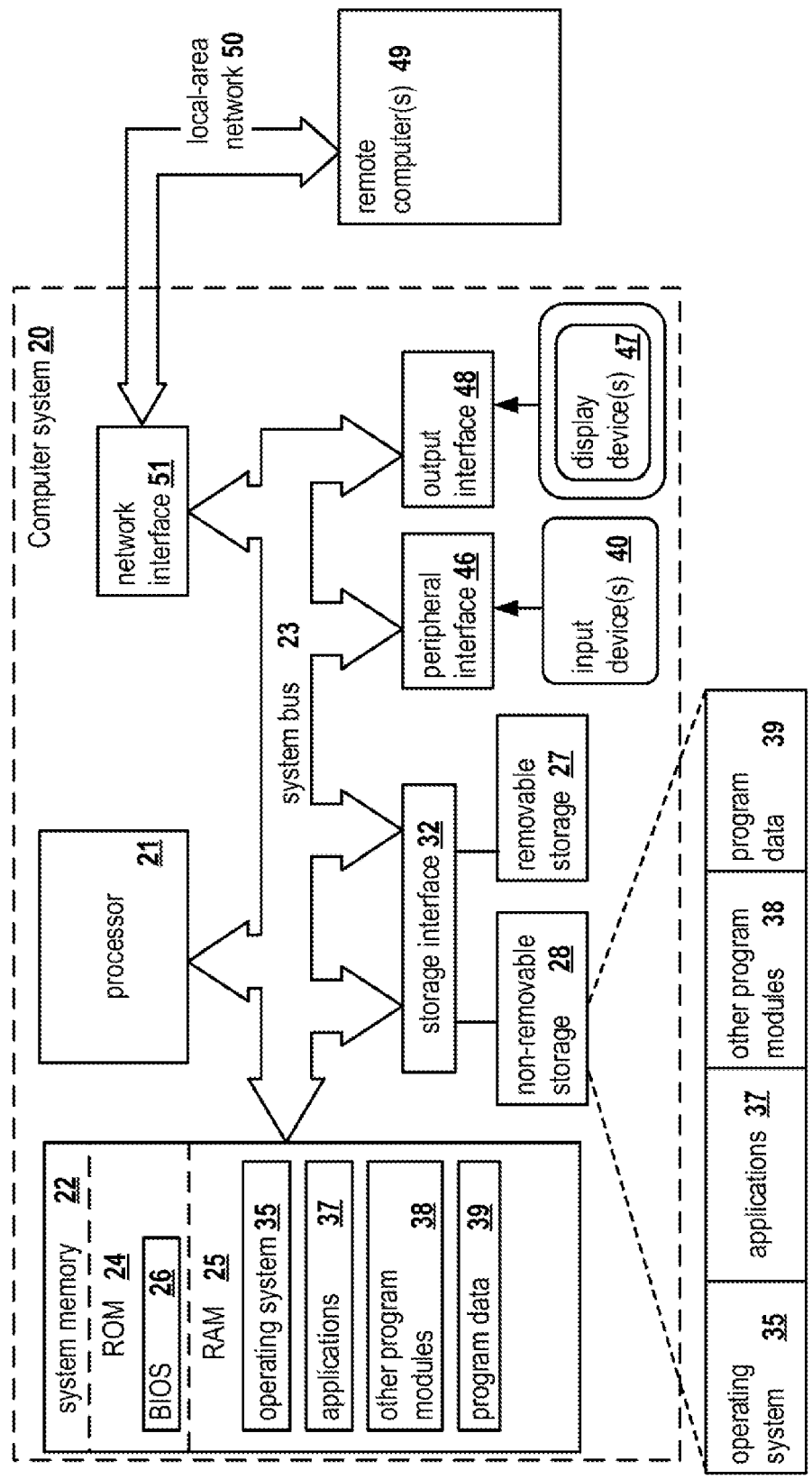

SYSTEM AND METHOD OF WEB STREAMING MEDIA CONTENT

CROSS REFERENCE TO RELATED APPLICATIONS

The current application claims priority to U.S. Patent Provisional Application No. 62/864,990, filed Jun. 21, 2019, the entire contents of which are hereby incorporated by reference.

TECHNICAL FIELD

The present disclosure generally relates to a system and method management and distribution of media content, and, more particularly, to a system and method of dynamic web streaming of media content without restore and batch processing.

BACKGROUND

With the ever increasing amount of media content that is being generated and stored for later recall, entities and individuals are constantly searching for techniques to minimize resource consumption and reduce costs for such media storage. Currently, content consumers typically archive monolithic files that containing hours of media content from an event, e.g., a live sporting event, for example. More specifically, such users archive these files in object stores in services, such as the Google Cloud Platform, while the keep a proxy (i.e., a much smaller/lower quality) version of this content online or even locally so they can allow staff access to review the archived footage.

However, using conventional systems, if a content consumer wishes to obtain a targeted or desired subsection of this content, the system will restore the whole file from an object store to a Cloud compute instance. Then, tooling such as ffMpeg can be run to process the file to produce the predetermined subrange as a new file. This new file can then be delivered to the user. However, this process is tedious and resource consuming. For example, depending on the size of the file, the process may require one hour or more to perform this preprocessing of the whole file before the predetermined subrange can be made available to the end user in the required high quality version of the content.

SUMMARY

According to an exemplary aspect, a system and method is provided for dynamic (or "just-in-time") web streaming of media content without restore and batch processing. Specifically, the system and method disclosed herein provide for a partial restore of media content, where a small sub-section of the archived media is requested by a user, for inclusion in an edit. This system addresses the conventional system problems of being resource intensive and expensive where the whole of the original piece must be restored. As such, the exemplary system provides a web server that is configured to offer grains for any part of an archived monolithic file to be made available just-in-time, instead of the batch processing. Because grains are available over HTTP, any part of the customer's archive is available to them instantly and dynamically with no restore process being required at all.

According to one exemplary embodiment, a system is provided for dynamic web streaming of media content without full restore of the media file. In this aspect, the system includes a file store configured to store at least one linear file comprising a plurality of chunks of media content; a media file parser configured to parse the at least one linear file of media content to identify a file format of the at least one linear file; a file structure analyzer configured to generate file access metadata based on the identified file format, with the generated file access metadata providing indexing access information for the plurality of chunks of the media content; a media access provider configured to generate an index file based on the generated file access metadata, the generated index file configured to provide access to a web browser for access only a portion of the at least one linear file based on a streaming protocol associated with the web browser; and a media content streaming provider configured to receive a media access request from the web browser, access the respective chunks of media content corresponding to the portion of the at least one linear file, and stream the accessed chunks of media content to the web browser, with the accessed chunks of media content configured to be consumed by the web browser based on the streaming protocol associated with the web browser. Moreover, according to the exemplary aspect, the web browser is configured to generate the media access request based on the generated index file, such that the generated media access request includes a plurality of frame offsets configured to be interpreted by the media content streaming provider to access respective chunks of media content. Yet further, the system further comprises a web server that includes each of the media file parser, the file structure analyzer, the media access provider, and the media content streaming provider, with the web server communicatively coupled to the file store and the web browser.

In another exemplary aspect, the media content streaming provider is configured to stream the accessed chunks of media content to the web browser without restore or batch processing the entirety of the at least one linear file stored in the file store.

In another exemplary aspect, the web server is configured to provide source, flow, and grain abstractions of the media content of the at least one linear file to the web browser, such that the web browser is configured to dynamically access a video timeline of the media content to requests grains of the media content of the at least one linear file.

In another exemplary aspect, the grains comprise encapsulated chunks of the media content corresponding to the portion of the at least one linear file.

In another exemplary aspect, the web browser is configured to provide a graphical user interface to present a proxy file of the at least one linear file, and to receive a user input that targets a selected subset of the media content of the at least one linear file based on a corresponding selected portion of the proxy file.

In another exemplary aspect, the web server further comprises a format transformation module configured to dynamically transform the format of the accessed chunks of media content to a video consumption format for the web browser before the media content streaming provider transmits the accessed chunks of media content to the web browser.

In yet another embodiment, a system is provided for real-time web streaming of media content without full restore of the media file. The system includes a media file parser configured to parse at least one linear file of media content to identify a file format of the at least one linear file, wherein the at least one linear file comprises a plurality of chunks of media content; a file structure analyzer configured to generate file access metadata based on the identified file format, with the generated file access metadata providing indexing access information for the plurality of chunks of the media content; a media access provider configured to generate an index file based on the generated file access metadata, the generated index file configured to provide access to a web browser for accessing only a portion of the at least one linear file based on a streaming protocol associated with the web browser; and a media content streaming provider configured to receive a media access request from the web browser, access the respective chunks of media content corresponding to the portion of the at least one linear file, and stream the accessed chunks of media content to the web browser, with the accessed chunks of media content configured to be consumed by the web browser based on the streaming protocol associated with the web browser. Moreover, the system further comprises a web server that includes each of the media file parser, the file structure analyzer, the media access provider, and the media content streaming provider, with the web server communicatively coupled to the web browser and a file store hosting the at least one linear file.

In yet another embodiment, a system is provided for real-time web streaming of media content without full restore of the media file. In this aspect, the system includes a media file parser configured to parse at least one linear file of media content to identify a file format of the at least one linear file, wherein the at least one linear file comprises a plurality of chunks of media content; a file structure analyzer configured to generate file access metadata based on the identified file format; a media access provider configured to generate an index file based on the generated file access metadata, the generated index file configured to provide access to a web browser for accessing only a portion of the at least one linear file based on a streaming protocol associated with the web browser; a media content streaming provider configured to receive a media access request from the web browser, access the respective chunks of media content corresponding to the portion of the at least one linear file, and stream the accessed chunks of media content to the web browser, with the accessed chunks of media content configured to be consumed by the web browser based on the streaming protocol associated with the web browser.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

FIG. 3 is a block diagram illustrating a computer system on which aspects of systems and methods for providing dynamic web streaming of media content in accordance with exemplary aspects of the present disclosure.

DETAILED DESCRIPTION

Figure 1:
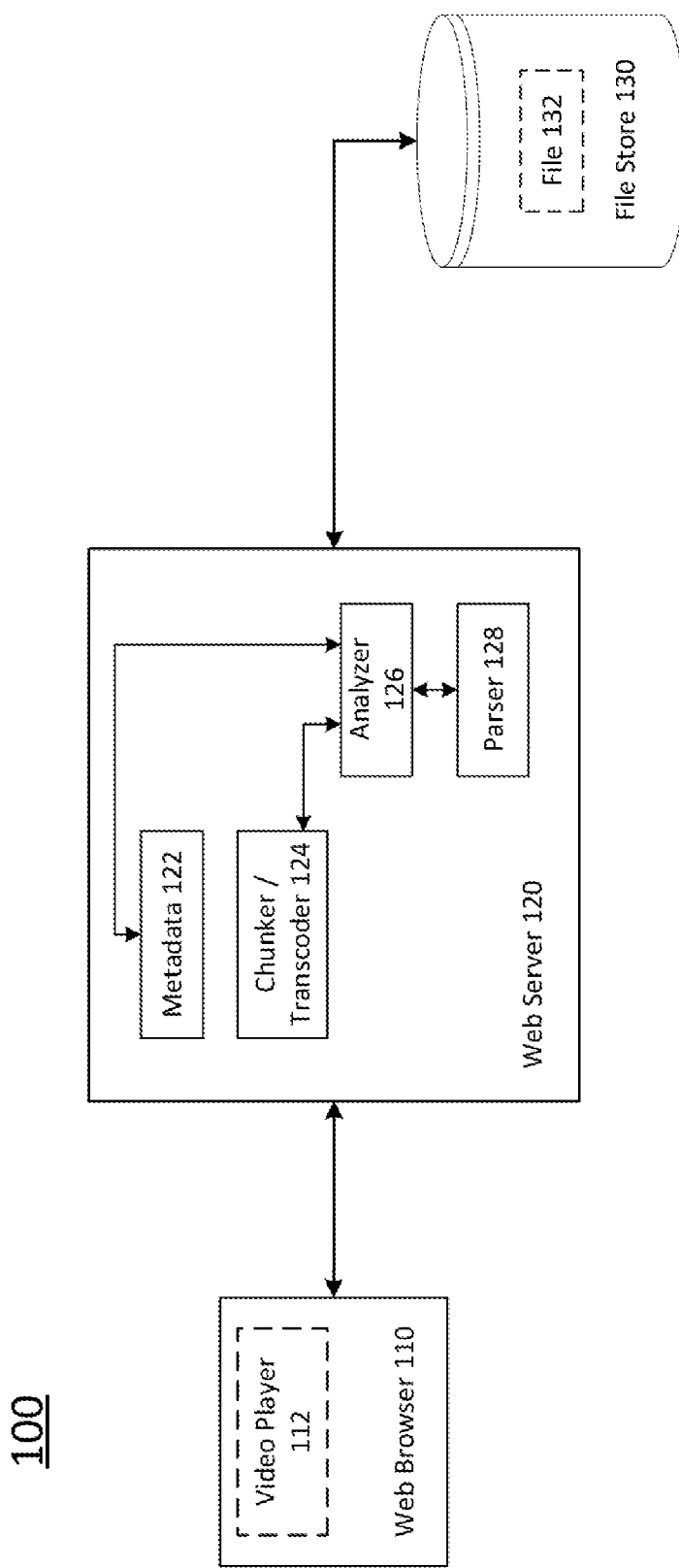
FIG. 1 is a block diagram of a system for providing dynamic web streaming of media content in accordance with exemplary aspects of the present disclosure.

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

FIG. 1 is a block diagram of a system for providing dynamic web streaming of media content in accordance with exemplary aspects of the present disclosure. As shown, the system 100 generally includes a web browser 110, a web server 120 and a file store 130. In an exemplary embodiment, the file store 130 can be, for example, an online/remote file storage service or cloud computing service. Examples of such services include Amazon® Simple Storage Service ("S3"), Microsoft® Azure ("Azure") ad Google Cloud® computer services. However, according to alternative embodiments, the file store 130 can be a data storage service (e.g., a video server) located on a premises of an enterprise, such as a video editing and production company, In any event, the file store is configured to store/archive one or a plurality of unprocessed or linear monolithic files that can include video and audio essence data (generally referred to as media content) and that can be stored in various media file formats, such as MXF, MOV, MP4, WMV, and the like. Moreover, as described above, using conventional systems, when a user (e.g., a user of web browser 110) wishes to restore a small portion of one or more media files stored in file store 130 (e.g., stored on the Google Cloud platform), the whole file would first be restored to a Cloud compute instance and then provided to end user, with such restore time sometimes being an hour or more depending on the size of the requested file. As described herein, the exemplary system and method alleviates this cumbersome and time-consuming file access methodology by providing dynamic media access in real-time or "just-in-time" to the end user.

As further shown, the web browser 110 includes a video player 112 that can be configured to receive and consume (e.g., display and/or playout) the portion of requested media content received from file store 130. Thus, according to one exemplary aspect, the web browser 110 can be part of a video editing system or software application in which the user can transmit a media access request to request only a specific or designated portion of the media file 132 stored in file store 130, as will be described in detail below. However, it should be appreciated that the system and methodology disclosed herein is not so limited to using a video player, such as video player 112, for access the desired media essence, and that such methodology can be implemented to transform the source file (e.g., file 132) to many other forms, suitable for many other types of clients, as would be appreciated to one skilled in the art.

According to the exemplary aspect, system 100 further includes a web server 120 that serves as an interface between web browser 110 and file store 130 and is configured to receive file access requests from the web browser 110 and in turn stream a subset (i.e., a plurality of data chunks) from file store 130. In this aspect, only the specifically requested data chunks corresponding to the desired portion of the file 132 are provided the web browser 110 and consumed through video player 112, such that the entire media contents of file 132 does not need to be restored before such subset of media essence can be provided to the user.

In general, the web server 120 is configured to provide source, flow, and grain abstractions for the file 132 available to end users (e.g., web browser 110) as simple HTTP requests. In an exemplary aspect, a source can be considered a single stream with a source group (e.g., camera feeds), such as a video track, that enables access to essence with different renditions. Moreover, flows are streams of grains that have the same type of payload and thus only one rendition. Flows map time (e.g., frame offsets) to bytes of the media file and thus provide an index into the grains at a particular time. Grains are encapsulated essence chunks, i.e., the units of media essence of the media file 132, such as frames, GOPs (groups of pictures) of video, sample of audio, or the like.

According to the exemplary aspect, the web server 120 is configured to mount any file as a source and can mount a file as a source to multiple requested client devices. In effect, all the payloads within the file 132 are configured to be instantly available as individual grains over HTTP an in response to the HTTP request from the web browser 110. Advantageously, processing of the media content is executed for each grain or chunk of the media file 132 as it is asked for by the web browser 110. Advantageously, the web server 120 is configured to provide the grains (i.e., data chunks of the media file 132) for any part of the archived monolithic file 132, such they are be made available just-in-time, instead of the batch processing as required by conventional systems. Effectively, since grains are available over HTTP, then any part of the customer's archive in file store 130 is available to them instantly, with no "restore" process being required at all.

As further shown in FIG. 1, the web server 120 includes a plurality of components configured to execute the methodology and algorithms described herein. For example, according to one aspect, the web server 120 includes software code (e.g., processor executable instructions) in memory, which may be configured to execute/facilitate the media access requests from web browser 110 in order to access the requested data chunks from file store 130. Thus, as described in detail below, the web server 120 can include a metadata component 122, a chunker/transcoder 124, a media file analyzer 126 and a media file parser 128 for executed the media access algorithms according to the exemplary aspect.

In the exemplary embodiment, the media file parser 128 is configured to parse each linear file (e.g., file 132) containing the media content to identify a respective file format. In an exemplary aspect, it should be appreciated that the media file parser 128 can parse the file at the time the media content is generated (e.g., upon receiving captured image data from a camera at a live event) or it can subsequently parse the media file when it is loaded to the web server by a system administrator, customer, or the like, for example. In either event, the media file parser 128 is configured to analyze and determine the format of the file in question.

Moreover, the web server 120 includes file structure analyzer 126 that is configured to generate file access metadata based on the file format identified by the media file parser 128. In other words, the file structure analyzer 126 is configured to obtain the results of the output from parser 128 to determine the structure of the video and audio essence contained in the file 132. In one aspect, this analysis is provided as the file access metadata that can be stored in the file store 130 for recall. Moreover, the file access metadata can comprise information, such as indexing access information, for accessing one or more of the chunks essence of media content of the file 312.

The web server 120 can further include a metadata component 122 that is configured to offer or otherwise provide files structured to provide an index conforming to one or more streaming protocols that can be, for example, used by the web browser 110 to consume the video and audio essence. For example, in an exemplary aspect, the metadata component 122 can be configured as a media access provider that can generate an index file based on the file access metadata generated by the file structure analyzer. In this aspect, the generated index file is configured to provide access to a content consuming device, such as web browser 110, for dynamically accessing a designated and/or targets subset or specific portion of the linear file 132 based on a streaming protocol used by the content consuming device to consume the media essence.

The web server 120 further includes transcoder and chunker components 124 that work in concert to offer one or more data chunks of essence (e.g., measured in a few seconds duration) conforming to the streaming protocol of the specific web browser 110 and/or video player 112. In this aspect, the chunker component is configured to format a grain request to meet the layout expectations of the client. For example, this formatting may invoke a transcoder to transcode the source file essence into LongGOP payloads suitable for decoding in the browser. Moreover, the chunker performs this formatting for each grain requested received by the web server. It should be appreciated that this process is not necessarily sequential and that it can be random access. The metadata service has provided grain access information to the web client so the client may jump around on the video timeline asking for grains in response to each user click. However when the users hits play, the ordering of requests will be sequential as the video player linearly askes for the sequence of grains to play the video In general, the transcoder and chunker components 124 can be configured as a media content streaming provider that receives a media access request from the web browser 110, accesses the respective chunks of media content corresponding to the portion of the linear file 132, and streams the accessed chunks of media content to the web browser 110 for consumption by video player 112, for example. As noted above, the chunks of media content accessed by the media content streaming provider 124 can be configured to be consumed by the web browser 110 based on the streaming protocol associated with the web browser.

According to the exemplary embodiment, the web browser 110 is configured to generate a media access request based on the generated index file that is then transmitted to and processed by web server 120. For example, in one exemplary aspect, the user can locally store a proxy file (e.g., a low resolution version of the media content) at the client location. Upon review this proxy file, the web browser 110 can be configured to provide a graphical user interface that is configured to receive a media access request from the user. For example, the media access request be generated in response to a user selection of a desired or relevant time frame for a desired clip (i.e., subsection or targeted portion) of the media file 132. This index information can be based on frame offsets (e.g., counting or timecodes) that can be used to request the quality range for the media file 132. As a result, the generated media access request includes a plurality of frame offsets configured to be interpreted by the media content streaming provider 124 of the web browser 120 to access respective chunks of media content using the generated index information.

It is noted that in an alternative aspect, the content consuming device (e.g., web browser 110) can be provided as an automated retrieval system that is configured to automatically access the targeted media content of the linear media file 132. For example, in one aspect, the web browser 110 (or other content requesting device) can be configured to use maths by analyzing ingredients referenced in recipe files (i.e., edit decisions) to identify the frame offsets used as indexing information for access the desired/targeted media content.

Thus, according to an exemplary aspect, the web server 120 can be configured to stream or otherwise transmit chunks of media using protocols such as MPEG-DASH, HTTP Live Streaming (HLS), Smooth Streaming or the like. As described above, a file 132 stored in file store 130 can be stored in a format suitable for archiving linear video and audio essence, such as MXF, MOV, MP4, WMV, or the like, as described above. However, it should be appreciated that even if the web server 120 were to offer binary access to the file 132 in the file store 130, the web browser 110 hosting the video player 112 would not be able to directly play the video file 132 (or a subsection thereof), as the codecs used to compress media in the file (e.g., AVCi, DV100, J2K, IMX, etc.) are not supported by the browser based video player 112.

Accordingly, to offer the media contained in the linear file 132 in a form suitable for the web browser 110 to be consumed, the web server 120 in the exemplary aspect is configured to dynamically transform the media into a different form, making the media appear to honor one of the acceptable streaming protocols, such as MPEG-DASH, HTTP Live Streaming (HLS), Smooth Streaming or the like. Moreover, by using the exemplary methodology described herein, the system 100 does not need to make complete transcodes of the source file 132 into one of the streaming protocols by writing all payloads back to disk before the stream can be offered for consumption by the video player 112 in the web browser 110, of which the transcoding of the file can be well in excess of an hour depending on the size of the file.

Instead, using the web server 120 is configured to provide the specific chunks of the media file over HTTP so that they are available "just-in-time" without requiring any pre-processing of the file. Specifically, as described above, the web server 120 is configured to parse and analyze the media file 132, where this analysis is stored for later retrieval. Moreover, the web browser 110 is configured to connect to the web server 120 as described above and to request the index file offered by the metadata component 122. The index file references all the available chunks of the linear media file 132 that the video player 112 will need to play the video. Each chunk is sequentially requested in turn as that part of the video is required by the video player 112. As each request is made to the web server 120, the transcoder and chunker components 124 read from ranges in the original file 132 and produce a chunk in the desired format, i.e., the acceptable streaming protocol to be consumed by video player 112.

In a refinement of the exemplary aspect, the web server 120 can further include a media format transformation module (which can be a sub-component of the chunker 124 in one aspect) that is configured to transform the format of the individual (or a plurality) of chunks before streaming to web browser 110 for consumption. That is, a format transformation module can be provided that dynamically transforms the format of the accessed chunks of media content to a video consumption format appropriate for (i.e., compatible with) the web browser before the media content streaming provider transmits the accessed chunks of media content to the web browser.

In particular, using conventional storage systems as described above, the file store 130 typically stores the media in a file in a concrete from, such as a compressed MPEG4 LongGOP. As described above, the GOPs can be accessed directly. However, in an alternative aspect, the media format transformation module can be configured to use codecs to decompress the GOPs so that uncompressed pictures are available. Additionally, the media format transformation module can be configured to size, crop, change the color, add formatting or apply arbitrary processing to video essence. For example, in one aspect, the media format transformation module can be configured to generate small jpeg images so that the web browser can offer poster frames as thumbnails in a user interface of the web browser 110. Moreover, it should be appreciated that all these choices can be driven by the end user of the web browser 110, as the HTTP URL can contain the user requirements for any transformations. Thus, the system can be configured to generate the available URLs, and make them known to the client (e.g., web browser 110).

Figure 2:
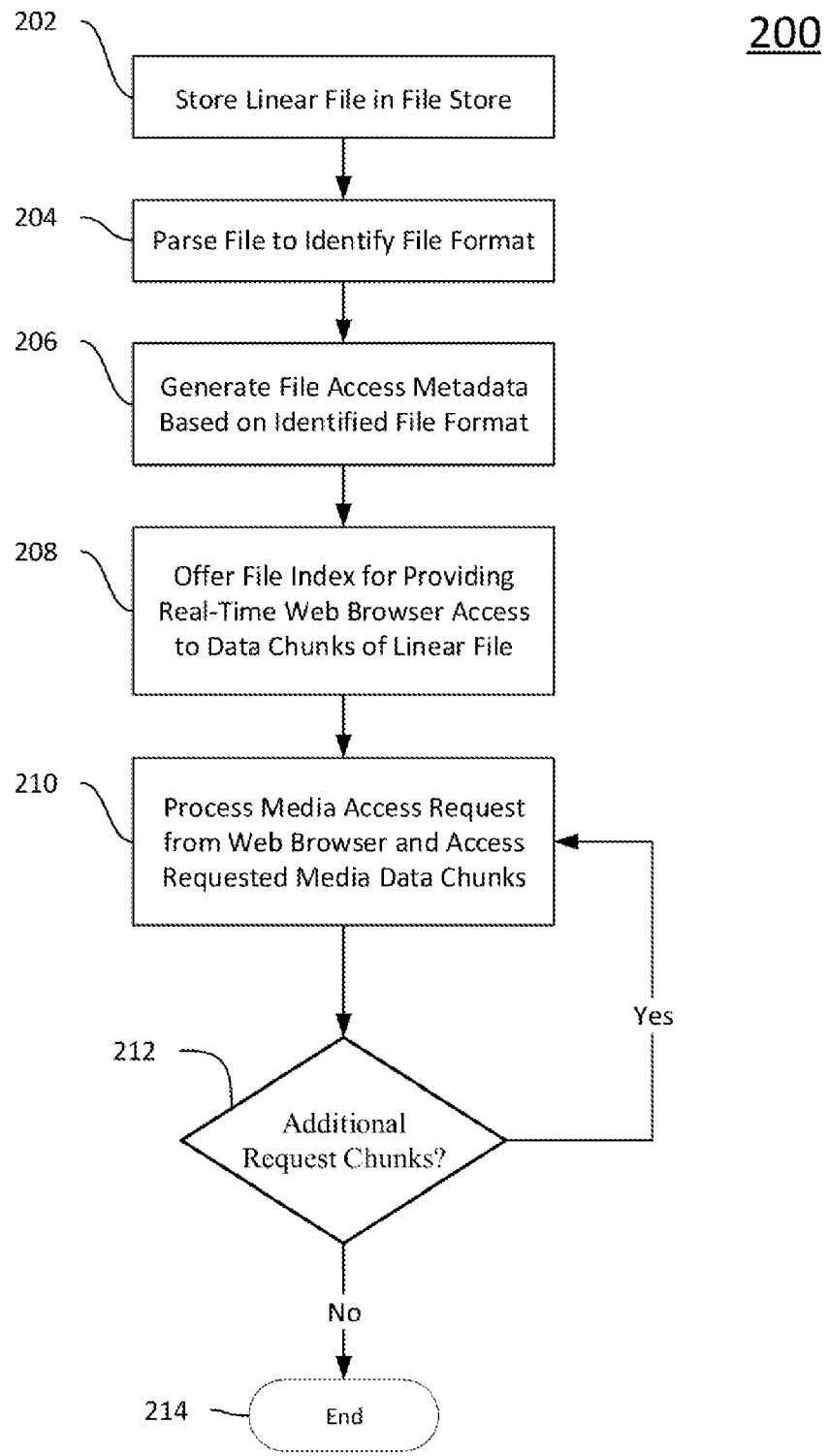
FIG. 2 is a flow diagram of a method for providing dynamic web streaming of media content in accordance with exemplary aspects of the present disclosure.

FIG. 2 is a flow diagram of a method 200 for providing dynamic web streaming of media content in accordance with exemplary aspects of the present disclosure. It should be appreciated that the method described herein can be implement on the system 100 and exemplary components thereof as described above.

As shown, initially at step 202, a file store is configured to store at least one linear file that includes a plurality of chunks of media content. Upon storage, a web browser includes a media file parser that is configured to parse the at least one linear file of media content to identify a file format of the at least one linear file at step 204. In alternative aspect, the parsing of the media file step 204 can be performed before or in parallel to the storage step 202.

Next, at step 206, a file structure analyzer of a web browser generates file access metadata based on the identified file format, with the generated file access metadata providing indexing access information for the plurality of chunks of the media content. At step 208, a media access provider then generates and offers an index file based on the generated file access metadata, such that the generated index file can provide access to a web browser (or other content consuming device) for access only a portion of the at least one linear file based on a streaming protocol associated with the web browser. The web browser can then generate a media access request, using a proxy file for example as described above, to access a desired or targeted subsection or clip of the media file stored on the file store.

Thus, at step 210, the web server includes a media content streaming provider that receives and processes the media access request from the web browser and accesses the respective chunks of media content corresponding to the portion of the at least one linear file. Each data chunk is then streamed "just-in-time" to the web browser. As described above and at step 210, the web server can stream the accessed chunks of media content according to the acceptable streaming protocol associated with the web browser. Moreover, in an exemplary aspect, a media format transformation module of the web server can reformat each chunk, using, for example, codecs to decompress the GOPs so that uncompressed pictures are available. Alternatively or in addition, the media format transformation module can be configured to size, crop, change the color, add formatting or apply arbitrary processing to video essence.

Finally, as shown at step 212, each chunk for the selected/desired video clip is streamed "just-in-time" until all data chunks of the requested video and audio essence are streamed to the web browser. As a result, the exemplary methodology can allow for millions of hours of archive material to be made available as streaming media on a just-in-time basis, by effectively trading time and space (i.e., time to pre-process all the media and space to store the resulting footage) for processing power (i.e., the just-in-time nature of the processing can account for elastic provisioning as the demand rose and fell during changes in work load). As a result, all processed media can be cached so that no footage needed to be transcoded more than once as is necessary using conventional media processing and access systems as described above.

FIG. 3 is a block diagram illustrating a computer system 20 on which aspects of systems and methods of dynamic web streaming of media content without restore and batch processing. It should be noted that the computer system 20 can correspond to the web server 120 or any components therein. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20. It should be appreciated that in one exemplary aspect, the one or more removable storage devices 27 can correspond to file store 130.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces. It should be appreciated that in an exemplary aspect, the remote computer 49 can correspond to a content consuming device, such as a device configured to execute web browser 110 as described above.

In general, it is noted that the exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 1, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for real-time web streaming of media content without full restore of a media file, the system comprising:
   a file store configured to store at least one linear file comprising a plurality of chunks of the media content;
   a media file parser configured to parse the at least one linear file of the media content to identify a file format of the at least one linear file;
   a file structure analyzer configured to generate file access metadata based on the identified file format, with the generated file access metadata providing indexing access information for the plurality of chunks of the media content;
   a media access provider configured to generate an index file based on the generated file access metadata, the generated index file configured to provide access to a web browser for accessing only a portion of the at least one linear file based on a streaming protocol associated with the web browser, wherein the portion of the at least one linear file comprises less than an entirety of the at least one linear file stored in the file store;
   a media content streaming provider configured to receive a media access request from the web browser, access respective chunks of the media content corresponding to the portion of the at least one linear file, and stream the accessed chunks of the media content to the web browser, with the accessed chunks of the media content configured to be consumed by the web browser based on the streaming protocol associated with the web browser,
   wherein the web browser is configured to generate the media access request based on the generated index file, such that the generated media access request identifies a plurality of frame offsets configured to be interpreted by the media content streaming provider to access the respective chunks of media content that only correspond to the portion of the at least one linear file without restoring an entirety of the at least one linear file, and wherein the system further comprises a web server that includes each of the media file parser, the file structure analyzer, the media access provider, and the media content streaming provider, with the web server communicatively coupled to the file store and the web browser.

2. The system according to claim 1, wherein the media content streaming provider is configured to stream the accessed chunks of the media content to the web browser without restoring or batch processing the entirety of the at least one linear file stored in the file store.

3. The system according to claim 1, wherein the web server is configured to provide source, flow, and grain abstractions as HTTP requests of the media content of the at least one linear file to the web browser, such that the web browser is configured to dynamically access a video timeline of the media content to request grains of the media content of the at least one linear file.

4. The system according to claim 3, wherein the grains comprise encapsulated chunks of the media content corresponding to the portion of the at least one linear file.

5. The system according to claim 1, wherein the web browser is configured to provide a graphical user interface to present a proxy file of the at least one linear file, and to receive a user input that targets a selected subset of the media content of the at least one linear file based on a corresponding selected portion of the proxy file.

6. The system according to claim 1, wherein the web server further comprises a format transformation module configured to dynamically transform a format of the accessed chunks of the media content to a video consumption format for the web browser before the media content streaming provider transmits the accessed chunks of the media content to the web browser.

7. A system for real-time web streaming of media content without full restore of a media file, the system comprising:
a media file parser configured to parse at least one linear file of the media content to identify a file format of the at least one linear file, wherein the at least one linear file comprises a plurality of chunks of the media content;
a file structure analyzer configured to generate file access metadata based on the identified file format, with the generated file access metadata providing indexing access information for the plurality of chunks of the media content;
a media access provider configured to generate an index file based on the generated file access metadata, the generated index file configured to provide access to a web browser for accessing only a portion of the at least one linear file based on a streaming protocol associated with the web browser;
a media content streaming provider configured to receive a media access request from the web browser that identifies a frame offset to access only the portion of the at least one linear file, access respective chunks of the media content using the identified frame offset and corresponding to the portion of the at least one linear file without restoring an entirety of the at least one linear file, and stream the accessed chunks of the media content to the web browser, with the accessed chunks of the media content configured to be consumed by the web browser based on the streaming protocol associated with the web browser,
wherein the system further comprises a web server that includes each of the media file parser, the file structure analyzer, the media access provider, and the media content streaming provider, with the web server communicatively coupled to the web browser and a file store hosting the at least one linear file.

8. The system according to claim 7, wherein the web browser is configured to generate the media access request based on the generated index file, such that the generated media access request includes the frame offset configured to be interpreted by the media content streaming provider to access the respective chunks of the media content.

9. The system according to claim 8, wherein the web browser is configured to provide a graphical user interface to present a proxy file of the at least one linear file, and to receive a user input that targets a selected subset of the media content of the at least one linear file based on a corresponding selected portion of the proxy file.

10. The system according to claim 7, wherein the portion of the at least one linear file comprises less than an entirety of the at least one linear file stored in the file store.

11. The system according to claim 7, wherein the media content streaming provider is configured to stream the accessed chunks of the media content to the web browser without restoring or batch processing the entirety of the at least one linear file stored in the file store.

12. The system according to claim 7, wherein the web server is configured to provide source, flow, and grain abstractions as HTTP requests of the media content of the at least one linear file to the web browser, such that the web browser is configured to dynamically access a video timeline of the media content to request grains of the media content of the at least one linear file.

13. The system according to claim 12, wherein the grains comprise encapsulated chunks of the media content corresponding to the portion of the at least one linear file.

14. The system according to claim 7, wherein the web server further comprises a format transformation module configured to dynamically transform a format of the accessed chunks of the media content to a video consumption format for the web browser before the media content streaming provider transmits the accessed chunks of the media content to the web browser.

15. A system for real-time web streaming of media content without full restore of a media file, the system comprising:
a media file parser configured to parse at least one linear file of media content to identify a file format of the at least one linear file, wherein the at least one linear file comprises a plurality of chunks of the media content;
a file structure analyzer configured to generate file access metadata based on the identified file format;
a media access provider configured to generate an index file based on the generated file access metadata, the generated index file configured to provide access to a web browser for accessing only a portion of the at least one linear file based on a streaming protocol associated with the web browser;
a media content streaming provider configured to receive a media access request from the web browser that identifies a frame offset to access only the portion of the at least one linear file, access respective chunks of the media content using the identified frame offset and corresponding to the portion of the at least one linear file without restoring an entirety of the at least one linear file, and stream the accessed chunks of the media content to the web browser, with the accessed chunks of the media content configured to be consumed by the web browser based on the streaming protocol associated with the web browser.

16. The system according to claim 15, wherein the system further comprises a web server that includes each of the media file parser, the file structure analyzer, the media access provider, and the media content streaming provider, with the web server communicatively coupled to the web browser and a file store hosting the at least one linear file.

17. The system according to claim 16, wherein the portion of the at least one linear file comprises less than an entirety of the at least one linear file stored in the file store.

18. The system according to claim 12, wherein the media content streaming provider is configured to stream the accessed chunks of the media content to the web browser without restoring or batch processing the entirety of the at least one linear file stored in the file store.

19. The system according to claim 16, wherein the web server is configured to provide source, flow, and grain abstractions as HTTP requests of the media content of the at least one linear file to the web browser, such that the web browser is configured to dynamically access a video timeline of the media content to request grains of the media content of the at least one linear file.

20. The system according to claim 19, wherein the grains comprise encapsulated chunks of the media content corresponding to the portion of the at least one linear file.

21. The system according to claim 16, wherein the web server further comprises a format transformation module configured to dynamically transform a format of the accessed chunks of the media content to a video consumption format for the web browser before the media content streaming provider transmits the accessed chunks of the media content to the web browser.

22. The system according to claim 15, wherein the generated file access metadata provides indexing access information for the plurality of chunks of the media content, and the media access provider is configured to generate the index file based on the indexing access information.

23. The system according to claim 22, wherein the web browser is configured to generate the media access request based on the generated index file, such that the generated media access request includes the frame offset configured to be interpreted by the media content streaming provider to access the respective chunks of the media content.

24. The system according to claim 23, wherein the web browser is configured to provide a graphical user interface to present a proxy file of the at least one linear file, and to receive a user input that targets a selected subset of the media content of the at least one linear file based on a corresponding selected portion of the proxy file.

* * * * *